INVENTORS
H.L. BOOTS
B.L. WHITSON
BY Young & Quigg
ATTORNEYS

INVENTORS
H.L. BOOTS
B.L. WHITSON

ATTORNEYS

INVENTORS
H.L. BOOTS
B.L. WHITSON

ATTORNEYS

United States Patent Office 3,288,697
Patented Nov. 29, 1966

3,288,697
PHOTOREACTION CONTROL APPARATUS
Bobbie L. Whitson and Harold L. Boots, Bartlesville, Okla., assignors to Phillips Petroleum Company, a corporation of Delaware
Filed July 19, 1962, Ser. No. 210,900
7 Claims. (Cl. 204—193)

This invention relates to a method and apparatus for automatic operation of a chamical reaction. In one of its more specific aspects it relates to the automatic sequential operation of batch ultraviolet reactors. In another aspect, this invention relates to an apparatus wherein control is maintained over reaction conditions in each phase of the reaction.

The reaction of olefins with hydrogen sulfide to produce mercaptan compounds is well known in the art. In the past such a reaction was promoted by the use of various types of catalyst. It has been found more recently that the preparation of such mercaptans, such as butyl mercaptan, can be effectively carried out when using ultraviolet light to promote the reaction. However, in the past the production of butyl mercaptan in an ultraviolet reactor has been controlled manually using sight gauges, pressure indicators, timers and the like to allow the operator to maintain control over the reaction. Operation in such a manner becomes economically unfeasible when the process is to be carried out in multiple systems. When carrying out the process in multiple systems there exist certain points in the operation of same where control over the conditions in the reactor and the particular operation phase being carried out in any part of the overall system is required. For example, in a two-reactor system the olefin cannot be introduced into the first reactor at the time the first reactor is being emptied of the formed mercaptans. Likewise, the second reactor cannot be filled when the second reactor is dumping its contents.

In accordance with the present invention we have now found that by providing an interlocked reaction system there can be achieved requisite control over any particular phase of the reaction being carried out.

More specifically, we have found out that the sequential operation of ultraviolet reactors can be controlled by adapting the interlocking control system of the present invention to same.

Thus it is an object of this invention to provide a system for the sequential operation of batch type reactors.

Another object of this invention is to provide a controlled operation of a multi-system operation.

Another object is to provide a fully controlled interlocked system for preparing butyl mercaptan.

Other objects, aspects, and the several advantages of this invention will be readily apparent from the following disclosure, the drawings, and the appended claims.

FIGURES 3, 3a, 4, 4a, and 5 are schematic representations of the control system of the present invention.

Figure 1:
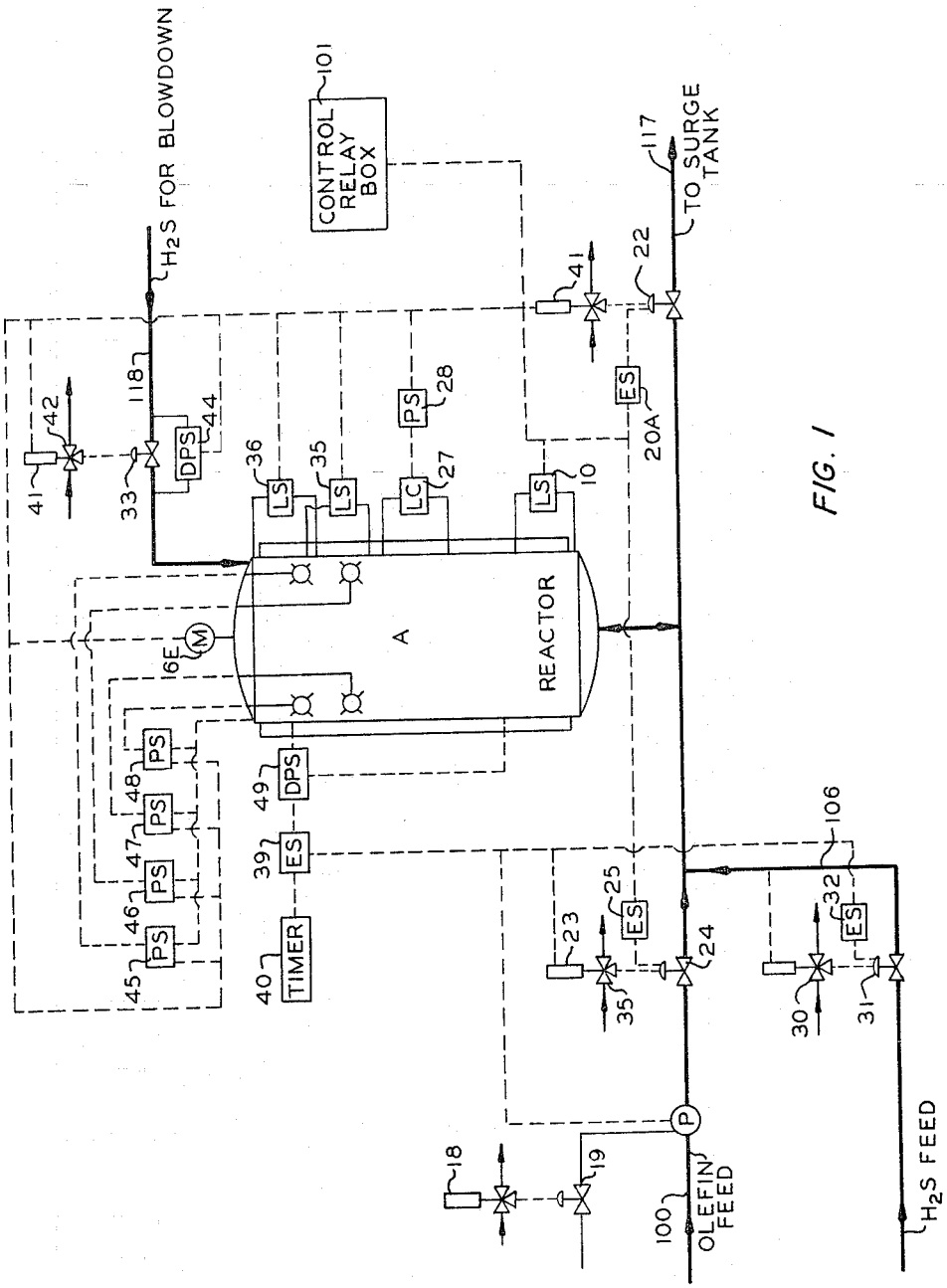
FIGURE 1 is a diagrammatic view of a system for operating a single reactor in accordance with the present invention.

As shown in FIGURE 1, the reactor 19 is charged with olefin through line 100. By applying power to the control box 101 the olefin continues to charge the reactor until the level reaches a preselected level as determined by liquid level controller 102. When the preselected level is reached, a 3 to 15 p.s.i.g. signal is sent to PS 103, which then sends an electronic signal to the control relay box 101. This then energizes solenoid 104 for air for air-operated valve 105 which allows the air to vent off of air-operated valve 105. This stops the flow of olefin in line 100 to the reactor A. The control box 101 then starts the mixer motor and energizes solenoid 108 which puts air on valve 109, opening the valve and allowing $H_2S$ to flow through line 106. $H_2S$ flows into the reactor until the level reaches LS 107; this signals the control box 101 which de-energizes solenoid 108, bleeding the air off valve 109 and stopping the flow of $H_2S$. The control box then turns on ultraviolet lights 110, 110b, 110c and 110d, and the lamps will remain on until pressure switches 111a, 111b, 111c and 111d, which are preset at a predetermined pressure, are satisfied at which time they are automatically cut off. This indicates that the reaction is completed. The reactor is controlled by a timer 112 or a differential vapor switch 113 depending on which is selected through electric switch 114 to control the reactor. When one of the two conditions above is satisfied it signals the control box 101, which stops the mixer motor and de-energizes solenoid 115 that controls the supply of air to motor valve 16. This allows the product in the reactor to dump to a surge tank through line 117. When the pressure in the reactor is lower than the $H_2S$ from blowdown line 118, differential pressure switch 125 senses the condition and de-energizes solenoid 119 so that air is put on motor valve 120, opening the valve. This serves to pressure the product out of the reactor. When the level has dropped to LS 121 the control box receives a signal and in turn causes EMV 119 to energize, bleeding the air off of DMV 120 and stopping the flow in line 118. Also, EMV 115 is energized, bleeding the air off motor valve 116, stopping the flow through line 117. The cycle is now completed and resets the control box in order to start the cycle over.

Figure 2:
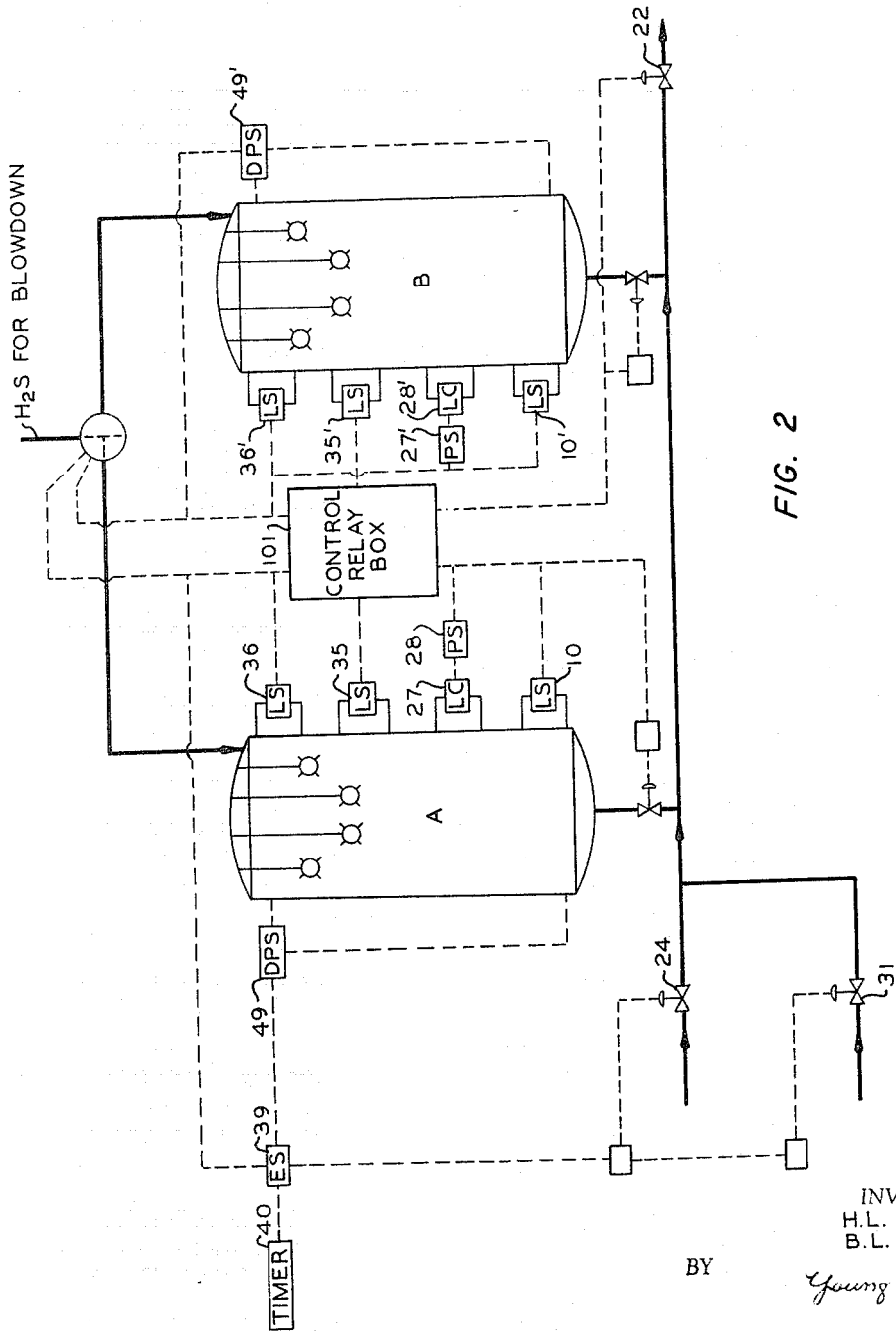
FIGURE 2 is a diagrammatic view of a system for operating two reactors in accordance with the present invention.

As shown in FIGURE 2, there are provided two reactors, A and B, in which the desired reaction is carried out. Both reactors are identical to that shown in FIGURE 1 with the exception that control relay box 101 is provided with various relays as illustrated in FIGURES 3, 3a, 4, 4a and 5 for maintaining control over the entire system.

Figure 3:
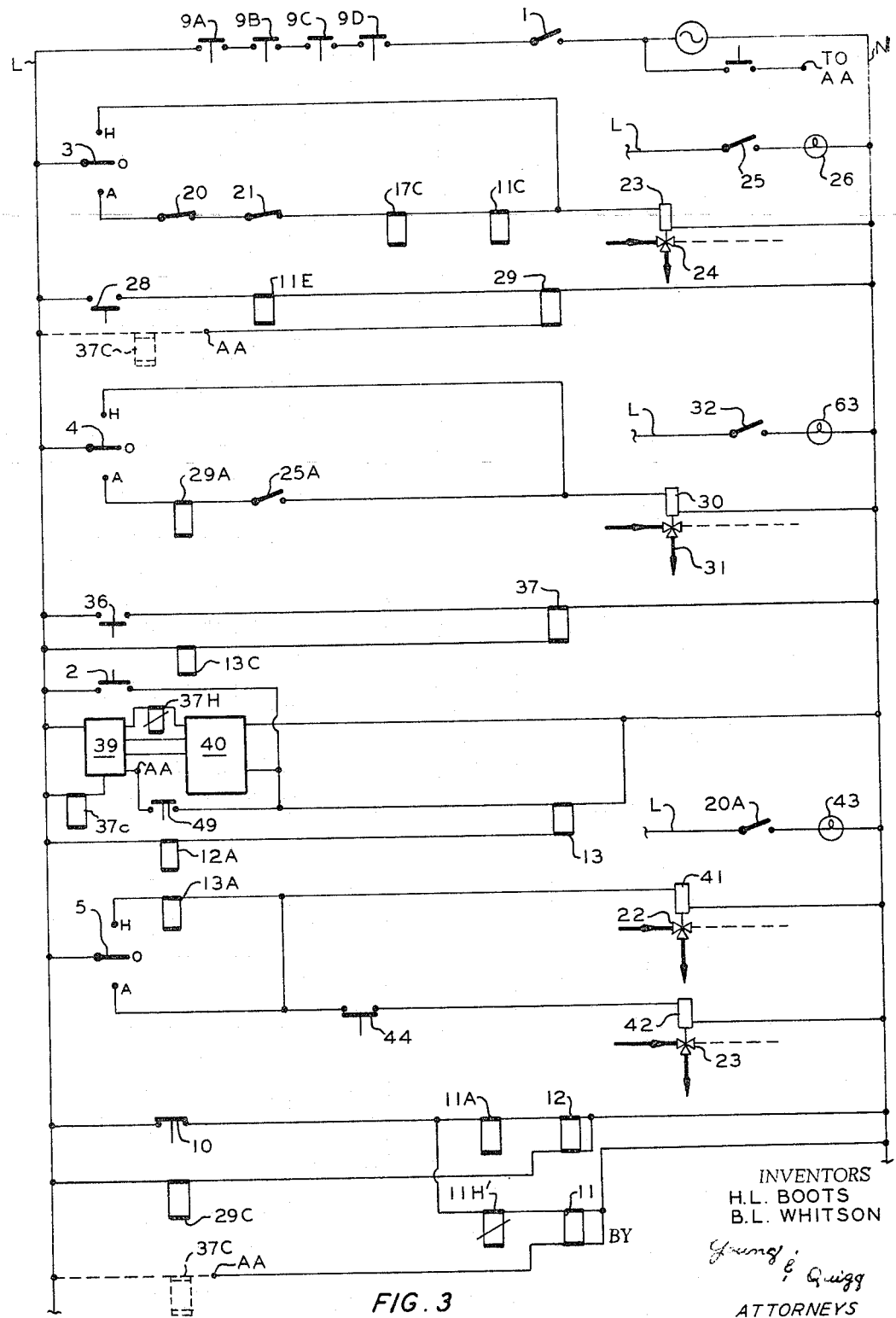
Figure 3A:
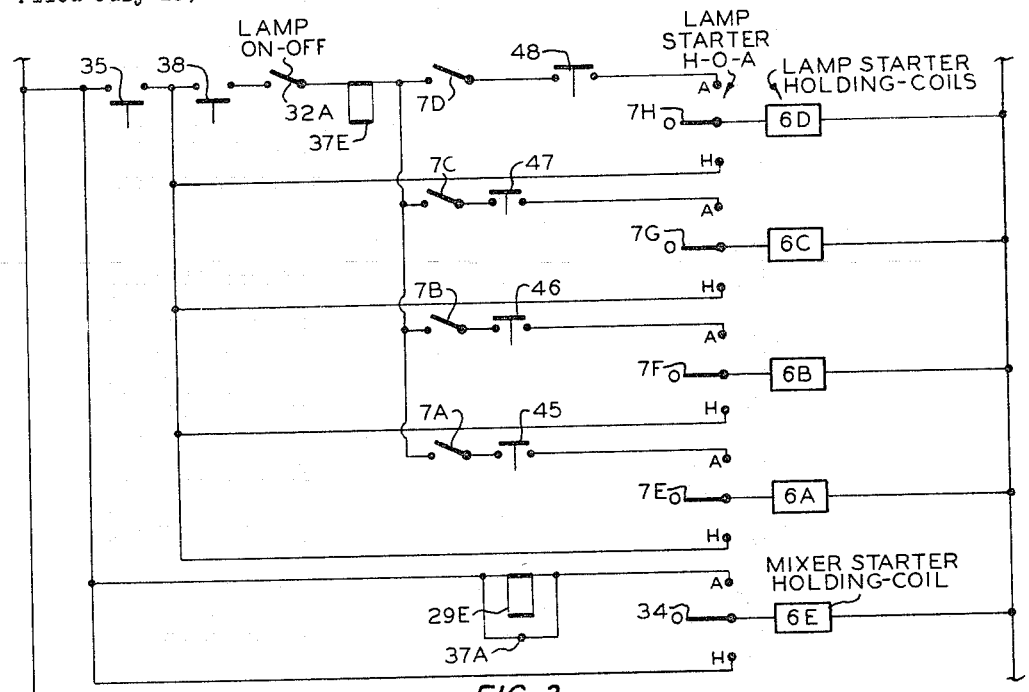
Figure 5:
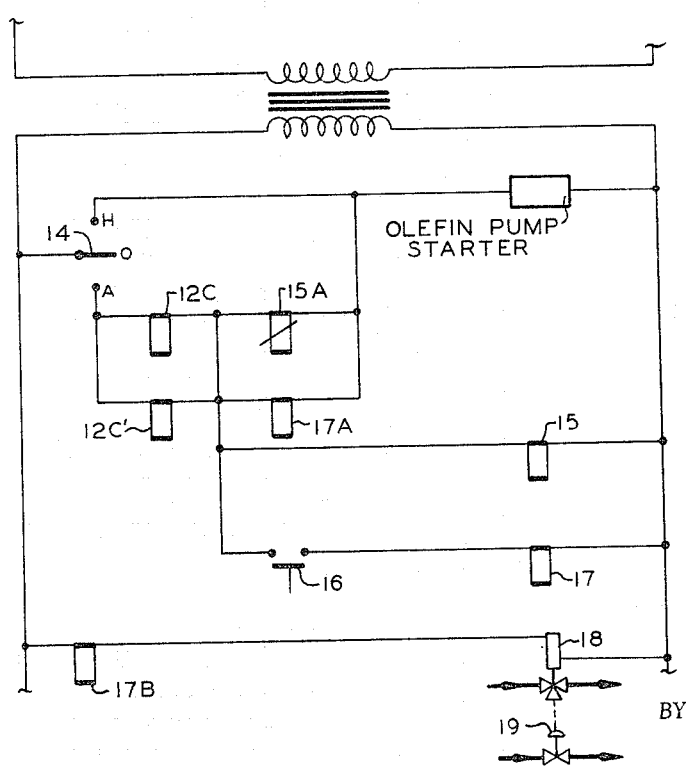
Figure 4:
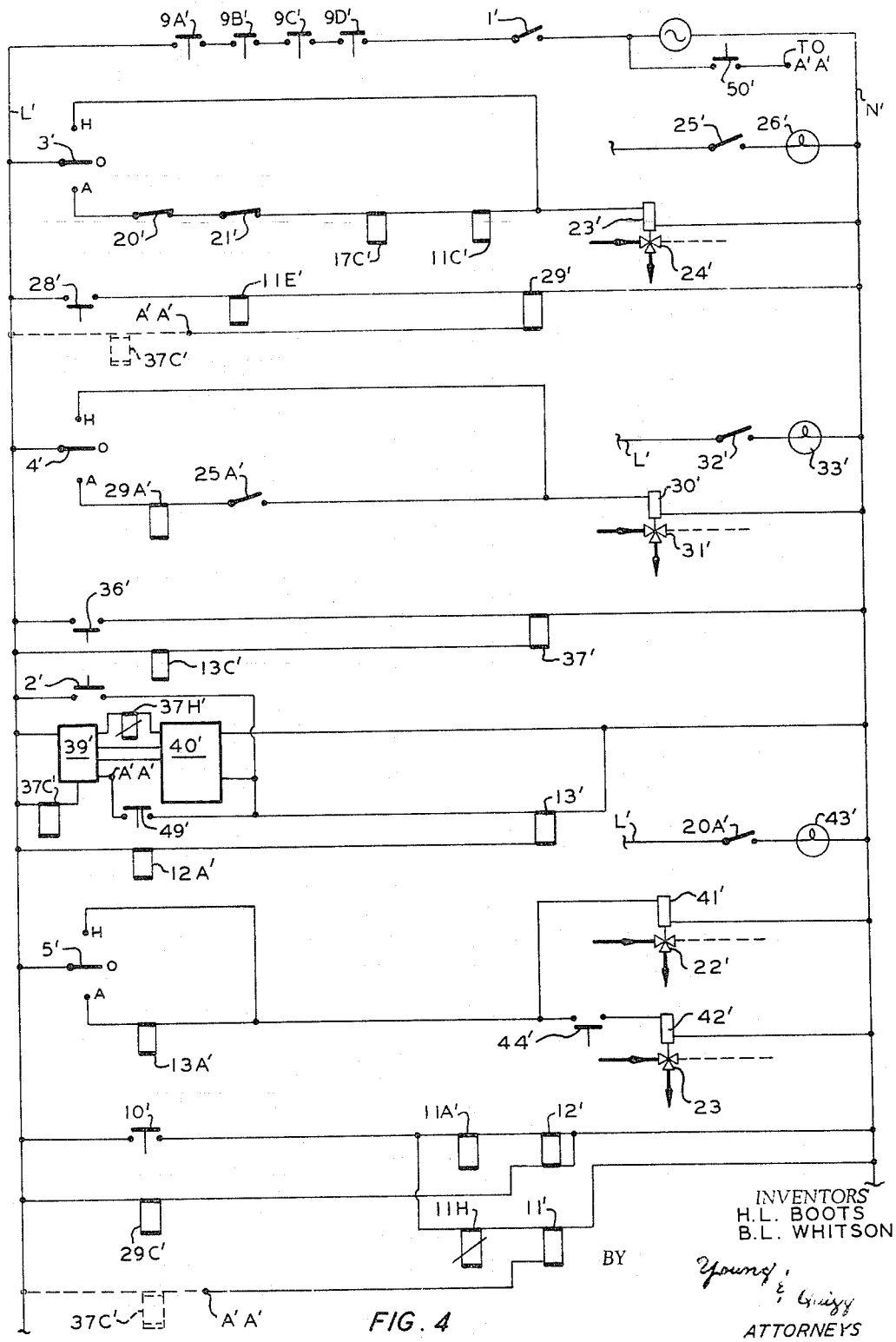
Figure 4A:
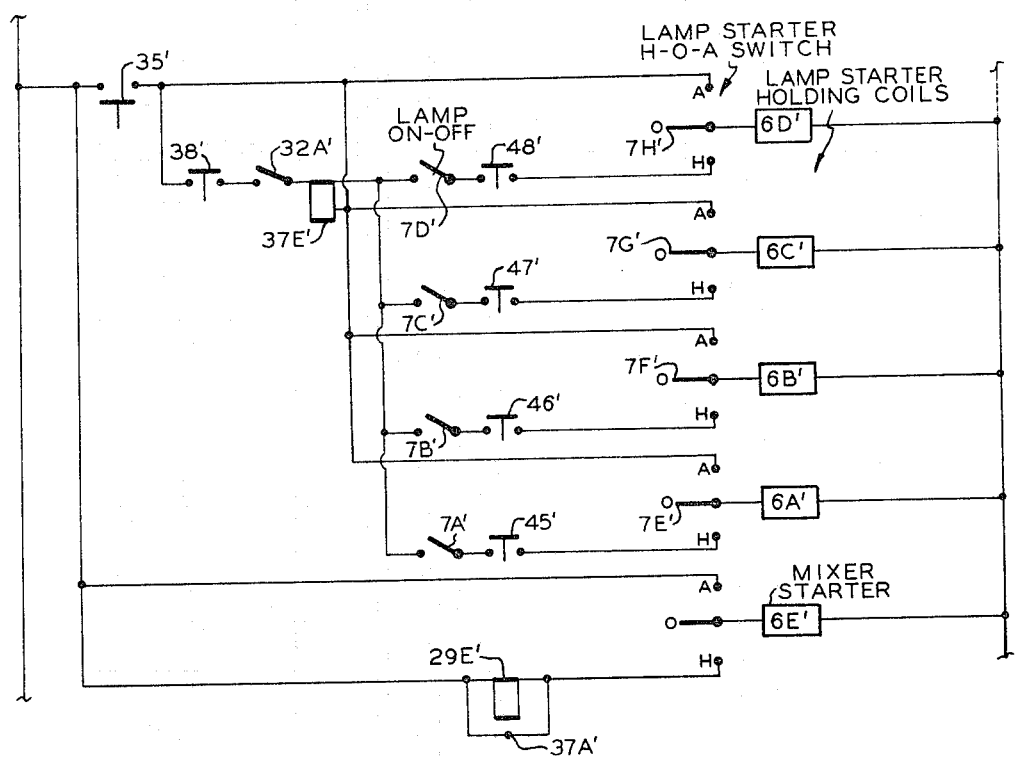

As shown in FIGURES 3, 3a, 4, 4a and 5, at the beginning of operation assuming both reactors are empty, electrical power switch 1 (reactor A) and electrical power switch 1' (reactor B) are in the off position. Electrical push button switch 2 (reaction cycle manual selector) for reactor A and 2' for reactor B are also in the off position. For purposes of clarity, from this point on, reactor A drawing (FIGURES 3 and 3a) will carry lead numbers. Reactor B drawing (FIGURES 4 and 4a) will carry prime numbers. However, FIGURE 5, being common to both units, will be referred to each time and will carry lead numbers. The following hand-off-automatic switches are placed in the automatic position: 3 (olefin to reactor), 4 ($H_2S$ to reactor), 5 (reactor dump valve), 7E, 7F, 7G, and 7H (lamp starters), and 14 (olefin pump, FIGURE 3). All lamp off-on switches 7A, 7B, 7C and 7D are placed in the on position. All diaphragm-operated motor valves are in the closed position except olefin pump vent line actuated by solenoid 18. Switch 1' (electrical power switch reactor B) will remain open until after reactor A has received its olefin charge. 9A, 9B, 9C and 9D (lamp well pressure switch) will be in the closed position unless a lamp well is ruptured. This is a safety device to protect personnel and equipment if the lamp well is ruptured. Level switch 10 (reactor empty) will be in the closed position when the reactor is empty. This switch is adapted to close on falling level and energizes relay 11 (latching coil type) and opens contact 11H which will prevent reactor B from starting its cycle until after reactor A is filled with olefin. Contact 11A closes and energizes relay 12. Contact 12A closes energizing relay 13 (delatching coil type). Contact 12C (FIGURE 3) closes starting olefin pump through closed contact 15A (FIGURE 5) operated by timer 15 (FIGURE 5) which is adjustable and will time out after about twenty seconds. Contact 15A (FIGURE 5) opens, and the olefin pump motor will stop unless a differential pressure has been established across the pump and the differential pressure switch 16 (FIGURE 5) is closed. Differential pressure switch 16 closes energizing olefin pump relay 17 (FIGURE 3). Contact 17A (FIGURE 5) closes by paralleling contact 15A (FIGURE 5). The olefin pump remains running. Contact 17B (FIGURE 3, olefin pump control) closes energizing solenoid (valve) 18 (FIGURE 5) for air to diaphragm motor valve 124 (FIGURE 5) on the olefin pump vent line. Diaphragm motor valve 124 (FIGURE 5) closes, thus closing the olefin pump vent line. Limit switch contact 20 (installed on motor valve 116, reactor A dump valve) and limit switch 21 (installed to actuate motor valve 120, H$_2$S pressure dump valve) are in the closed position. Limit switches 20 and 21 prevent reactor A from filling if in the dump cycle. Solenoid valve 104 for air to diaphragm motor valve 105 (olefin feed) is energized, applying air to the valve thus opening it and establishing olefin flow to reactor A. Limit switch contact 25 (installed on motor valve 105, olefin feed) closes and pilot light 26 comes on to indicate valve position. Olefin will fill reactor A to the desired preset level by the setting made on level control 102. Level control 102 transmits a pneumatic signal to pressure switch 103 when the predetermined level is reached. Relay 29 (latching coil type) is energized through contact 11E. Contact 29C closes and relay 12 (delatching coil type) is energized, contact 12C opens, shutting off olefin pump. Relay 17 is de-energized and time delay 15 is reset. Contact 17C opens, solenoid valve 23 for air to diaphragm motor valve 105 (olefin feed) is de-energized, and valve 24 closes. Limit switch 25 (installed on motor valve 24, olefin feed) opens and pilot light 26 goes out.

Through closed contact 29A and limit switch contact 25A (installed on motor valve 24, olefin feed), solenoid valve 30 for air to diaphragm motor valve 31 (H$_2$S feed) is energized, applying air to the valve thus opening it and establishing H$_2$S flow to reactor A. Limit switch contact 25A closes when limit switch contact 25 opens (both installed in motor valve 24, olefin feed). This prevents H$_2$S feed motor valve 31 from opening until after olefin feed 24 is closed. When motor valve 31 (H$_2$S feed) is open limit switch contact 32 (installed on motor valve 31, H$_2$S feed) closes and pilot light 63 comes on, indicating valve open position. H$_2$S fills reactor A to preset level by use of switch 36 (H$_2$S level switch) through contact 29E and switch 34 (mixer motor H-O-A selector), starting reactor A mixer motor 6E at the same time. Level switch 35 (reactor A, H$_2$S low level) closes on rising level when the liquid comes above the level of the top of the lamps. Level switch 36 (reactor A full) closes. Relay 37 (latching coil type) is energized. Contact 37A closes paralleling contact 29E keeping the mixer motor 6E running. Contact 37C closes. Relay 29 (delatching coil type) is energized and relay 11 (delatching coil type) is also energized, returning them to their normal positions. Contact 29A opens de-energizing solenoid valve 30 (H$_2$S fill), venting the air of diaphragm motor valve 31 (H$_2$S fill) thus closing it. Limit switch contact 32 (installed on motor valve 31) opens and pilot light 63 goes out, indicating the H$_2$S fill cycle has been completed. Limit switch contact 32A (installed on motor valve 31) closes. Contacts are closed on level switch 35 (reactor A, H$_2$S low level), nitrogen header pressure switch 38, limit switch contact 32A, and relay contact 37E. This applies power to the reactor ultraviolet lamp starter control circuits 6A, 6B, 6C and 6D. During the reaction cycle the lamps will be controlled by four hand-operated pressure switches 45, 46, 47 and 48. When the reactor pressure rises above the individual settings on each pressure switch, the individual lamp will be turned off.

The reaction time of the reactor can be controlled manually by switch 2, automatic timer 40, or the differential vapor pressure switch 41. The automatic timer or differential vapor pressure switch is selected by selector switch 39. With selector switch 39 set for automatic time cycle operation, contact 37C is closed. Contact 37H is open and the automatic timer 40 motor runs for a preset time. At the end of this period the timer contact energizes relay 13 (latching coil type), closing contact 13A which energizes solenoid valve 41 (reactor A dump) for air to diaphragm motor valve 22 (reactor A dump), thus opening it. Limit switch contact 20A (installed on motor valve 22) closes and pilot light 43 comes on to indicate valve position. If selector switch 39 is set for the differential vapor pressure switch 49, a solenoid in the automatic timer 40 is energized, keeping the timer from running. The differential vapor pressure switch 49 contact closes when the vapor pressure differential between the reactor sample and the base sample approaches zero. Relay 13 (latching coil type) is energized. This in turn starts the reactor sequential dump system as described above. Contact 13C closes, energizing relay 37 (delatching coil type). Contact 37E opens, turning off the ultraviolet lamps. Contact 37A opens, stopping mixer motor 6E. Differential pressure switch 44 (installed across air-operated diaphragm motor valve 33, H$_2$S blowdown) contact closes when reactor pressure becomes less than the H$_2$S supply pressure. This prevents the reactor product from back-flowing through the H$_2$S supply line that operates at a lower pressure. Solenoid valve 42 (H$_2$S blowdown) for air to diaphragm motor valve 33 (H$_2$S blowdown) is energized, thus opening motor valve 23. H$_2$S enters reactor A to pressure the product out of the reactor through motor valve 22 (reactor A dump). Level switch 10 (reactor empty) closes when the reactor is empty, and interlocking relay 11H′ closes unless reactor B is in the fill cycle. Relay 11 (latching coil type) is energized, contact 11A closes, energizing relay 12 (latching coil type), and contact 12A closes. Relay 13 (delatching coil type) is energized. Contact 13A opens, de-energizing solenoid valve 41 (reactor A dump) for air to diaphragm motor valve 22 (reactor A dump) is vented thus closing valve 22. Limit switch contact 20A (installed on motor valve 22) opens and pilot light 43 goes out, thus indicating valve position. Solenoid valve 42 (H$_2$S blowdown) is de-energized and air to diaphragm motor valve 33 (H$_2$S blowdown) is vented, thus closing valve 33. The sequential cycle has been completed, and all components have returned to their original settings. The sequence for reactors A and B is repeated from this point as stated above and will continue until manually stopped. Reactor B electrical power switch 1′ can be placed in the on position after reactor A has started to fill with olefin. Contact 11H will prevent reactor B from starting until after reactor A has filled with olefin and air diaphragm motor valve 24 (olefin feed) has closed. The sequential operation is the same for reactor B as for reactor A. Manual operation of either reactor can be accomplished by placing the individual hand-off-automatic switches in the hand position at the proper sequence of operation. Also, any sequence of automatic operation of reactor A or B can be overridden manually by use of the hand-off-automatic switch. By closing emergency dump switches 50 and 50′ the reactors will automatically dump. Latching relays have been used throughout the system. This enables the reactors to continue in the correct sequence after power has been restored, if a power failure should occur.

The following example further illustrates the present invention.

EXAMPLE

*Preparation of butyl mercaptan*

A 560-gallon batch type reactor is charged with 190 gallons of butylene through line 100. By applying power to the control box 101 the olefin continues to charge until the level reaches level controller 102. An electrical signal is then provided to solenoid valve 104 and the flow of olefin is stopped. The control box then starts the mixer and also allows $H_2S$ to flow through line 106. About 300 gallons of $H_2S$ are charged, which raises the level to actuate switch 107. This signals the control box and flow of $H_2S$ is stopped. Each lamp adapted with a pressure cut-off switch preset at 485, 490, 495 and 500 p.s.i.g., respectively, is cut on and will remain on until the pressure switches which have been preset turn off each lamp. The reaction is controlled either by a timer or a differential vapor pressure switch. When either the preselected time or differential preset pressure is satisfied, a signal is provided to the signal box which in turn cuts off the mixer and allows the resulting mercaptan to dump. The $H_2S$ serves to pressure the product out of the reactor for subsequent recovery. When the liquid level in the reactor recedes to level switch 121, the flow of $H_2S$ is shut off. The reactor is then ready for recharging.

While the above operation has been illustrated by the formation of butyl mercaptan, other olefins such as n-propylene, 3-chloropropylene, and n-octylene may be employed in a similar manner.

Reasonable variations and modifications are possible within the foregoing disclosure without departing from the spirit or scope thereof.

We claim:

1. Apparatus for simultaneous operation of a chemical process which comprises, in combination, means for providing at least two reactor chambers, means to introduce a first fluid into said chambers, means to introduce a second fluid into said chambers, mixing means in said chambers, means to provide radiation to said chambers, sensing means adapted in said reaction chambers to sense conditions in said chambers and provide a signal representative of said sensed conditions, and means responsive to said signal to regulate said mixing means, radiation means, and means to introduce said first and second fluids so as to provide controlled simultaneous operation of said apparatus.

2. Apparatus for carrying out a controlled and simultaneous formation of mercaptans by the reaction of an olefin and hydrogen sulfide in at least two ultraviolet reactors which comprises, in combination, a first and second ultraviolet reactor, means to introduce an olefin to said reactors, means to introduce a first stream of hydrogen sulfide to said reactors, means to introduce a second stream of hydrogen sulfide, liquid level controller means to regulate the amount of flow of said olefin and first hydrogen sulfide stream, means responsive to said liquid level controllers to activate said mixing means, a source of ultraviolet radiation, means responsive to said liquid level controllers to activate said source of radiation to maintain a predetermined temperature in said reactors, pressure sensing means so adapted as to determine when the reaction has gone to completion, means responsive to said pressure sensing means to regulate the flow of said second stream of hydrogen sulfide to remove the reactants from said reactor and interlocking means between said first and second reactors which is so adapted as to prevent introduction of said olefin and hydrogen sulfide to one of said reactors while the other is being filled and to prevent introduction of said second stream of hydrogen sulfide to one of said reactors while reactants are being removed from the other.

3. In an ultraviolet reaction system comprising an ultraviolet reactor, means to supply a first reactant to same, means to supply a second reactant to same, mixing means, a source of radiation, and means to remove reactants from said reactor, the improvement which comprises adapting to said reactor a plurality of liquid level controllers, means responsive to said liquid level controllers to regulate the amount of said first and second reactants introduced into said reactor, means responsive to said controllers to activate said mixing means and said source of radiation, means responsive to pressure sensing means to determine when the reaction is completed, and means responsive to said pressure sensing means to regulate said means to remove reactant from said reactor.

4. In an apparatus for the automatic sequential operation of a batch ultraviolet reactor comprising a first and second reaction chamber, means for introducing reactant materials into said chambers, means for introducing a material into the upper portion of said chambers, a mixing device in said chambers, means to provide a source of radiation in said chambers, and means to remove the reaction products from said chambers; the improvement which comprises a control system adapted thereto having, in combination, means adapted to said means for introducing reactant materials to said chambers to regulate the amount of feed to said reaction chambers, means to actuate said mixing means responsive to said regulating means, means to regulate the amount of ultraviolet radiation in said chambers, said means being responsive to vapor pressure, means to regulate the flow of material into said chambers responsive to said vapor pressure at such time as the reaction has been completed so as to remove the desired product from same, and interlocking means adapted to said reaction chambers so as to regulate the flow to and from same so that the introduction of reactants is prevented to one of said reaction chambers while the other is being filled and to prevent the introduction of material into the upper portion of one of said reaction chambers while the reaction products are being removed from the other.

5. Apparatus for carrying out a controlled and simultaneous formation of mercaptans by the reaction of an olefin and hydrogen sulfide in at least two ultraviolet reactors which comprises, in combination, a first and second ultraviolet reactor, means to introduce an olefin to said reactors, means to introduce a first stream of hydrogen sulfide to said reactors, means to introduce a second stream of hydrogen sulfide, liquid level controller means to regulate the amount of flow of said olefin and first hydrogen sulfide stream, means responsive to said liquid level controllers to activate said mixing means, a source of ultraviolet radiation, means responsive to said liquid level controllers to activate said source of radiation to maintain a predetermined temperature in said reactors, timing means so adapted as to determine when the reaction has gone to completion, means responsive to said timing means to regulate the flow of said second stream of hydrogen sulfide to remove the reactants from said reactor and interlocking means between said first and second reactors which is so adapted as to prevent introduction of said olefin and hydrogen sulfide to one of said reactors while the other is being filled and to prevent introduction of said second stream of hydrogen sulfide to one of said reactors while reactants are being removed from the other.

6. In an ultraviolet reaction system comprising an ultraviolet reactor, means to supply a first reactant to same, means to supply a second reactant to same, mixing means, a source of radiation, and means to remove reactants from said reactor, the improvement which comprises adapting to said reactor a plurality of liquid level controllers, means responsive to said liquid level controllers to regulate the amount of said first and second reactants introduced into said reactor, means responsive to said controllers to activate said mixing means and said source of radiation, means responsive to a member selected from the group consisting of timing means or pressure sensing means to determine when the reaction is completed, and means responsive to timing means to determine when the reaction is completed and means responsive to said timing means to regulate said means to remove reactant from said reactor.

7. In an apparatus for the automatic sequential operation of a batch ultraviolet reactor comprising a first and second reaction chamber, means for introducing reactant materials into said chambers, means for introducing a material into the upper portion of said chambers, a mixing device in said chambers, means to provide a source of radiation in said chambers, and means to remove the reaction products from said chambers, the improvement which comprises a control system adapted thereto having, in combination, means adapted to said means for introducing reactant materials to said chambers to regulate the amount of feed to said reaction chambers, means to actuate said mixing means responsive to said regulating means, means to regulate the amount of ultraviolet radiation in said chambers, said means being responsive to a predetermined time, means to regulate the flow of material into said chambers responsive to said predetermined time at such time as the reaction has been completed so as to remove the desired product from same, and interlocking means adapted to said reaction chambers so as to regulate the flow to and from same so that the introduction of reactants is prevented to one of said reaction chambers while the other is being filled and to prevent the introduction of material into the upper portion of one of said reaction chambers while the reaction products are being removed from the other.

References Cited by the Examiner

UNITED STATES PATENTS

| | | | |
|---|---|---|---|
| 2,411,961 | 12/1946 | Evans et al. | 204—162 |
| 2,732,502 | 1/1956 | Darney | 250—45 |
| 2,906,878 | 9/1959 | Goodman | 250—45 |
| 3,085,955 | 4/1963 | Louthan | 204—162 |
| 3,114,776 | 12/1963 | Warner | 260—609 |

JOHN H. MACK, *Primary Examiner.*

HOWARD S. WILLIAMS, *Examiner.*